US012038626B2

(12) United States Patent
Thorsell et al.

(10) Patent No.: US 12,038,626 B2
(45) Date of Patent: *Jul. 16, 2024

(54) EYEWEAR LENS INTERCHANGE WITH MAGNETIC LATCH

(71) Applicant: Smith Sport Optics, Inc., Portland, OR (US)

(72) Inventors: Eric Thorsell, Portland, OR (US); Alberto Ventura, Portland, OR (US)

(73) Assignee: Smith Sport Optics, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,890

(22) Filed: Aug. 18, 2022

(65) Prior Publication Data

US 2022/0390761 A1 Dec. 8, 2022

Related U.S. Application Data

(63) Continuation of application No. 16/802,309, filed on Feb. 26, 2020, now Pat. No. 11,460,715.

(Continued)

(51) Int. Cl.
G02C 5/22 (2006.01)
G02C 1/08 (2006.01)
G02C 5/14 (2006.01)

(52) U.S. Cl.
CPC ............. G02C 5/22 (2013.01); G02C 1/08 (2013.01); G02C 5/146 (2013.01);

(Continued)

(58) Field of Classification Search
CPC . G02C 5/22; G02C 5/146; G02C 1/08; G02C 2200/02; G02C 2200/06; G02C 2200/08

(Continued)

(56) References Cited

U.S. PATENT DOCUMENTS 1,660,587 A * 2/1928 Tully .................... G02C 11/12
2/13
6,253,388 B1 7/2001 Lando
(Continued)

FOREIGN PATENT DOCUMENTS

EP 2607943 B1 5/2014
EP 2607944 B1 5/2014
(Continued)

OTHER PUBLICATIONS

Extended European Search Report received in EP App. No. 20159225.0 dated Jul. 23, 2020.

*Primary Examiner* — Zachary W Wilkes
(74) *Attorney, Agent, or Firm* — Dorsey & Whitney LLP

(57) ABSTRACT

A lens interchange mechanism for an eyewear may include a magnetic latch operatively associated with the eyewire of the eyewear, such that the a portion of the eyewire can be released, with a free end separating from another portion of the eyewire thereby forming a gap in the eyewire for the removal and installation of a lens. The magnetic latch mechanism may be further configured for easy re-latching by the application of opposing forces on the first and second eyewire portions to cause the free end to re-engage with the magnetic latch without manual actuation of the latch.

17 Claims, 16 Drawing Sheets

Related U.S. Application Data

(60) Provisional application No. 62/812,139, filed on Feb. 28, 2019.

(52) U.S. Cl.
CPC ..... *G02C 2200/02* (2013.01); *G02C 2200/06* (2013.01); *G02C 2200/08* (2013.01)

(58) Field of Classification Search
USPC .................................................. 351/90–102
See application file for complete search history.

(56) References Cited

U.S. PATENT DOCUMENTS

| | | |
|---|---|---|
| 6,592,220 B1 | 7/2003 | Cheong |
| 6,679,604 B1 | 1/2004 | Bove et al. |
| 7,175,276 B1 | 2/2007 | Hsiung |
| 7,192,135 B1 | 3/2007 | Cheng |
| 7,241,007 B2 | 7/2007 | Cody et al. |
| 7,431,453 B2 | 10/2008 | Hogan |
| 7,520,605 B1 | 4/2009 | Chen |
| 7,556,373 B2 | 7/2009 | Vanatta et al. |
| 7,645,040 B2 | 1/2010 | Habermann |
| 7,712,895 B2 | 5/2010 | Wang |
| 7,797,765 B2 | 9/2010 | Musal et al. |
| 7,874,669 B2 | 1/2011 | Moritz et al. |
| 7,931,366 B1 | 4/2011 | Lando |
| 8,025,396 B1 | 9/2011 | Power |
| 8,182,086 B2 | 5/2012 | Cheong |
| 8,303,111 B2 | 11/2012 | Lin |
| 8,322,849 B2 | 12/2012 | Krumme et al. |
| 8,430,506 B2 | 4/2013 | Chen |
| 8,480,226 B2 | 7/2013 | Ifergan |
| 8,613,515 B2 | 12/2013 | Earley |
| 8,641,188 B2 | 2/2014 | Dichiara |
| 8,668,330 B2 | 3/2014 | Reyes et al. |
| 8,702,232 B2 | 4/2014 | Chen |
| 8,800,067 B2 | 8/2014 | Saylor et al. |
| 8,827,443 B2 | 9/2014 | Huynh |
| 8,832,904 B2 | 9/2014 | Kidouchim |
| 8,905,539 B2 | 12/2014 | Chen |
| 8,911,075 B2 | 12/2014 | Chen |
| 8,911,076 B2 | 12/2014 | Calilung et al. |
| 8,915,586 B2 | 12/2014 | Porter |
| 8,960,896 B2 | 2/2015 | Chou et al. |
| 8,992,007 B2 | 3/2015 | Li |
| 9,004,679 B2 | 4/2015 | Chen |
| 9,010,928 B2 | 4/2015 | Fuchs et al. |
| 9,016,855 B2 | 4/2015 | Chen |
| 9,081,211 B2 | 7/2015 | Zelazowski |
| 9,081,213 B2 | 7/2015 | Weinberg |
| 9,104,043 B2 | 8/2015 | Crescenzi et al. |
| 9,122,078 B2 | 9/2015 | Calilung et al. |
| 9,188,792 B2 | 11/2015 | Calilung et al. |
| 9,192,519 B2 | 11/2015 | Tobia |
| 9,207,464 B2 | 12/2015 | Schmidt |
| 9,239,469 B2 | 1/2016 | Zider et al. |
| 9,261,711 B1 | 2/2016 | Chen |
| 9,279,999 B1 | 3/2016 | Weng et al. |
| 9,345,622 B2 | 5/2016 | McNeal et al. |
| 9,400,398 B2 | 7/2016 | Darcy |
| 9,400,401 B2 | 7/2016 | Darcy |
| 9,454,017 B2 | 9/2016 | Chen |
| 9,588,355 B2 | 3/2017 | Cohn |
| 9,606,372 B2 | 3/2017 | Berdan |
| 9,632,330 B2 | 4/2017 | Chilson et al. |
| 9,638,934 B2 | 5/2017 | Kidouchim |
| 9,678,358 B2 | 6/2017 | Lando |
| 9,678,359 B2 | 6/2017 | Lipawsky |
| 9,690,114 B2 | 6/2017 | Chen |
| 9,696,561 B2 | 7/2017 | Lin |
| 9,709,818 B1 | 7/2017 | Chen |
| 9,720,255 B2 | 8/2017 | Park |
| 9,726,901 B2 | 8/2017 | Porter |
| 9,740,021 B1 | 8/2017 | Chen |
| 9,759,929 B2 | 9/2017 | Rinehart |
| 9,778,483 B2 | 10/2017 | Chen |
| 9,795,513 B2 | 10/2017 | Padovani |
| 9,804,420 B2 | 10/2017 | Chute et al. |
| 9,829,719 B1 | 11/2017 | Neren |
| 9,857,606 B2 | 1/2018 | Chen |
| 9,895,266 B2 | 2/2018 | Reynolds et al. |
| 9,943,444 B2 | 4/2018 | Kilduff et al. |
| 9,964,779 B2 | 5/2018 | Poole |
| 9,983,415 B2 | 5/2018 | McGinley et al. |
| 10,197,814 B2 | 2/2019 | Thorsell et al. |
| 11,460,715 B2 * | 10/2022 | Thorsell .................. G02C 1/08 |
| 2009/0279047 A1 * | 11/2009 | Tsai .......................... G02C 5/22 |
| | | 351/153 |
| 2013/0321757 A1 | 12/2013 | Chen |
| 2014/0063439 A1 | 3/2014 | Chen |
| 2014/0157496 A1 | 6/2014 | Ginther et al. |
| 2014/0218677 A1 | 8/2014 | Chen |
| 2015/0022774 A1 | 1/2015 | Chen |
| 2016/0018670 A1 | 1/2016 | Lando et al. |
| 2016/0103332 A1 | 4/2016 | Lin |
| 2016/0116760 A1 * | 4/2016 | Chen ...................... G02C 9/04 |
| | | 351/109 |
| 2016/0216533 A1 | 7/2016 | Calilung et al. |
| 2016/0231588 A1 | 8/2016 | Serge |
| 2016/0287444 A1 | 10/2016 | Han et al. |
| 2016/0299359 A1 | 10/2016 | Ogawa et al. |
| 2016/0327810 A1 | 11/2016 | Cross |
| 2016/0354249 A1 | 12/2016 | Frank et al. |
| 2017/0045754 A1 | 2/2017 | Rubaud et al. |
| 2017/0108708 A1 | 4/2017 | Lin |
| 2017/0131563 A1 | 5/2017 | Shiue |
| 2017/0143545 A1 | 5/2017 | Zwolsman et al. |
| 2017/0219843 A1 | 8/2017 | Albouy |
| 2017/0307903 A1 | 10/2017 | Calilung et al. |
| 2017/0315382 A1 | 11/2017 | Jones |
| 2017/0329153 A1 | 11/2017 | Strenz |
| 2017/0357103 A1 | 12/2017 | Jiang et al. |
| 2017/0357104 A1 * | 12/2017 | Chen ...................... G02C 5/146 |
| 2018/0004008 A1 | 1/2018 | Froissard |
| 2018/0129075 A1 | 5/2018 | Zewe |

FOREIGN PATENT DOCUMENTS

| | | |
|---|---|---|
| EP | 2767861 A1 | 8/2014 |
| EP | 2674138 B1 | 11/2015 |
| EP | 3021159 A1 | 5/2016 |
| EP | 2723284 B1 | 3/2017 |
| EP | 3167854 A1 | 5/2017 |
| EP | 2304492 B1 | 9/2017 |
| EP | 2758828 B1 | 4/2018 |
| EP | 2893911 B1 | 6/2018 |
| EP | 3370106 A1 | 9/2018 |
| WO | 2009093279 | 7/2009 |
| WO | 2009103354 A1 | 8/2009 |
| WO | 2009113187 A1 | 9/2009 |
| WO | 2014111966 A1 | 7/2014 |
| WO | 2015054799 A1 | 4/2015 |
| WO | 2016070238 A1 | 5/2016 |
| WO | 2016079767 A1 | 5/2016 |
| WO | 2016124866 A1 | 8/2016 |
| WO | 2017013522 A1 | 1/2017 |
| WO | 2017162370 A1 | 9/2017 |
| WO | 2017189130 A1 | 11/2017 |
| WO | 2018007901 A1 | 1/2018 |
| WO | 2018050188 A1 | 3/2018 |

* cited by examiner

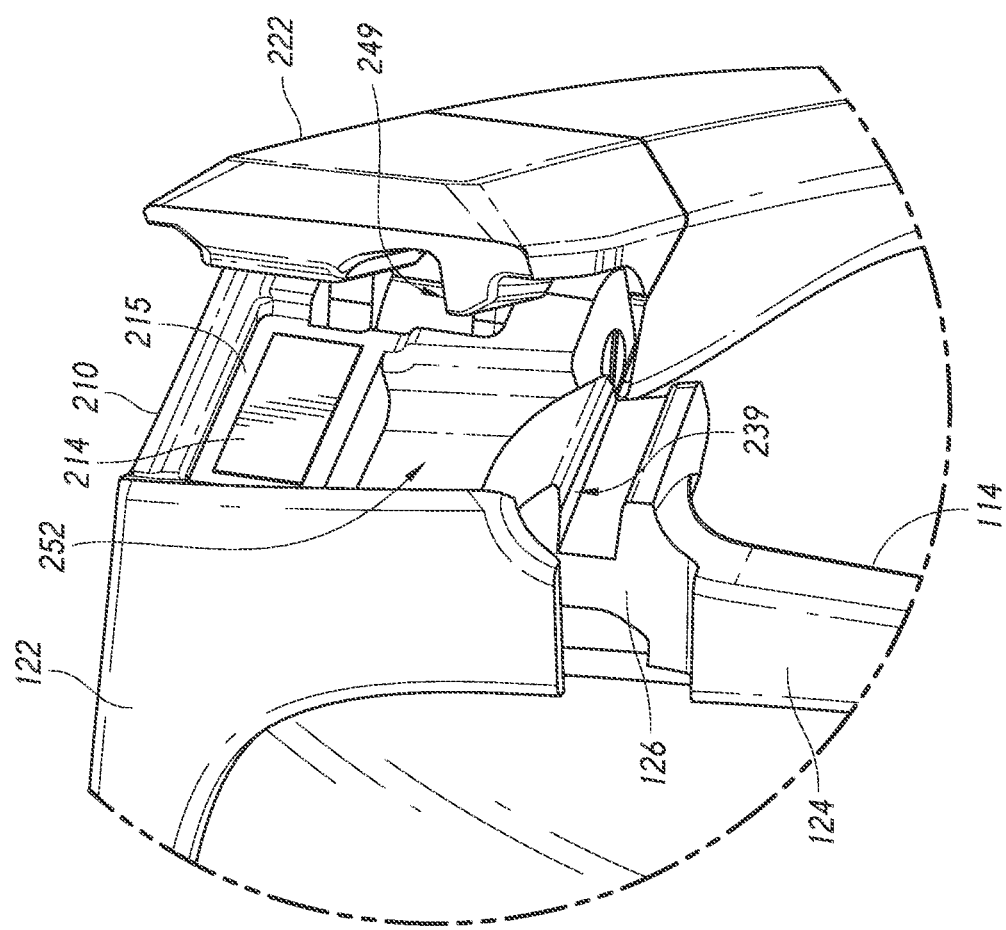

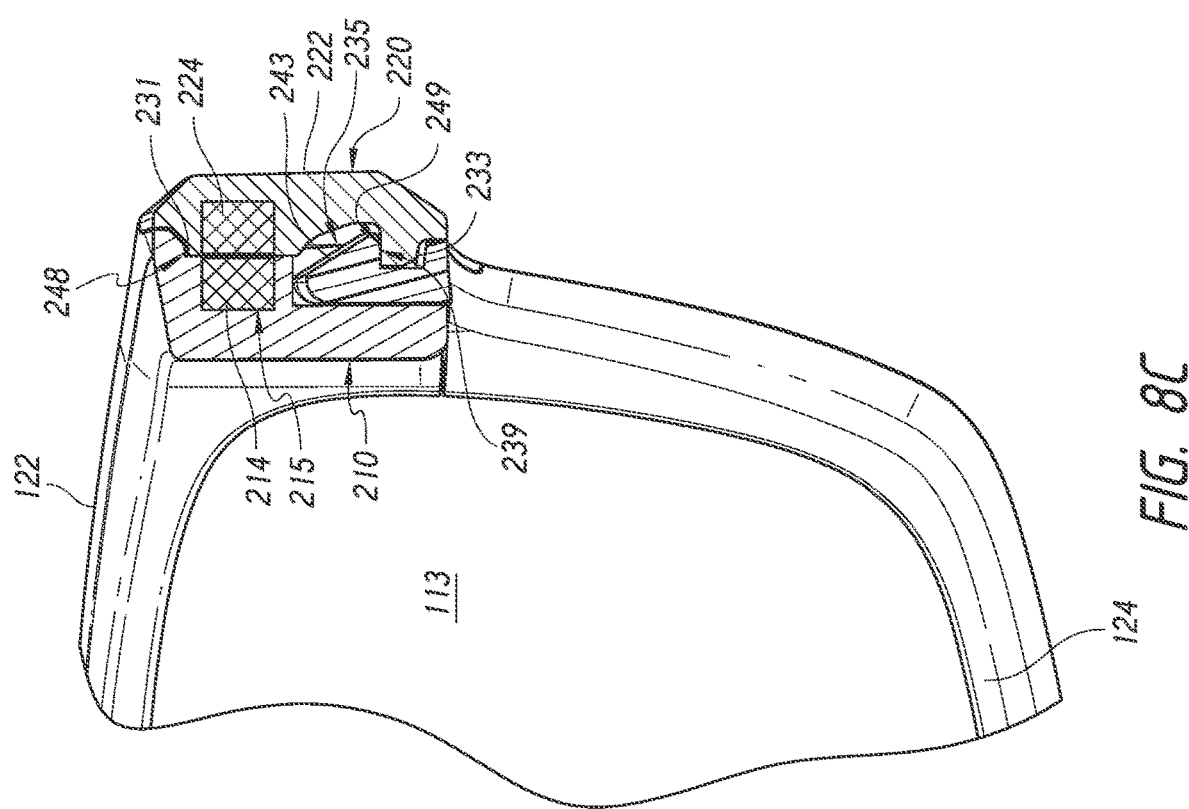

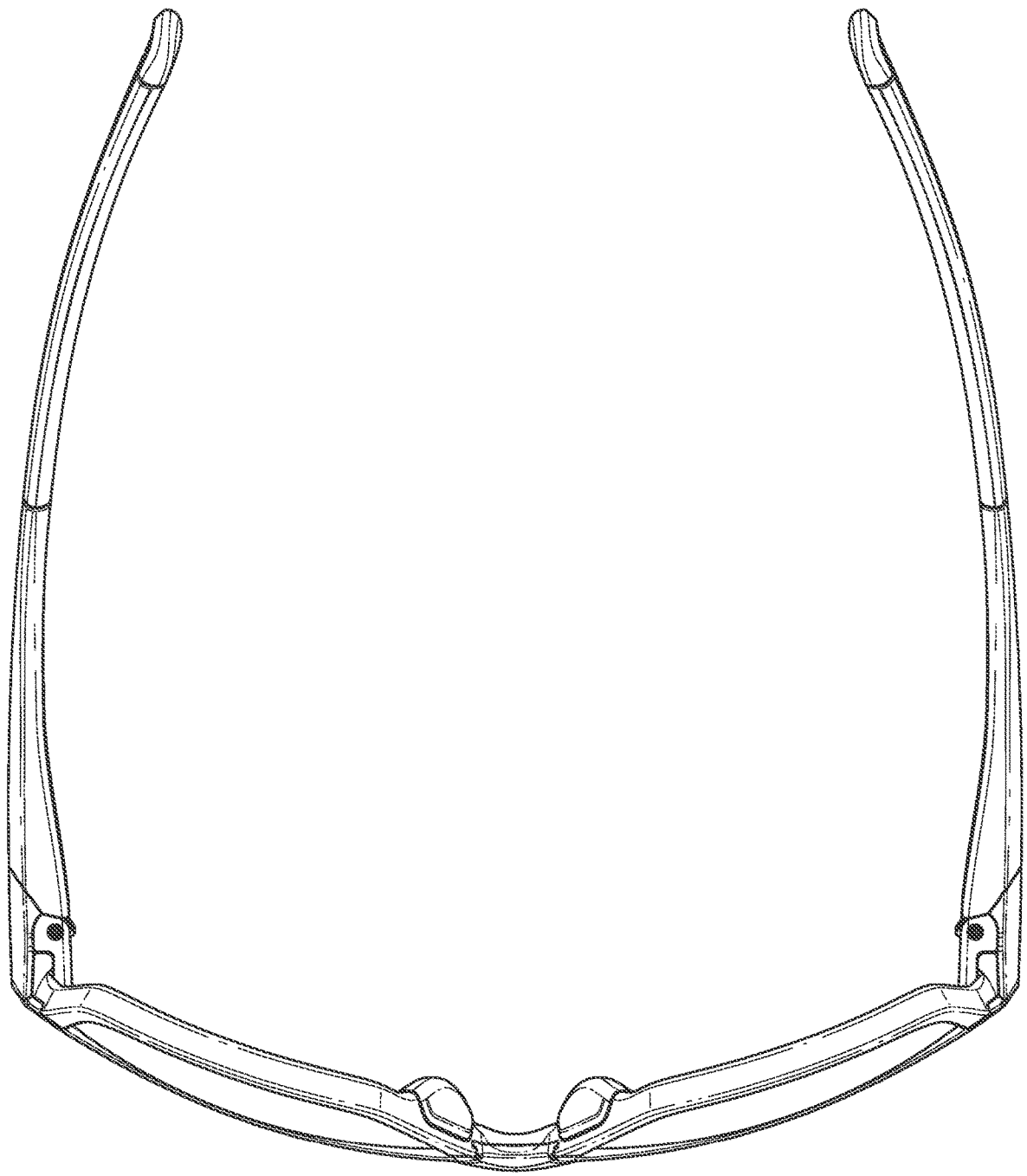

EYEWEAR LENS INTERCHANGE WITH MAGNETIC LATCH

CROSS-REFERENCE TO RELATED APPLICATION(S)

This application is a continuation of U.S. application Ser. No. 16/802,309 filed Feb. 26, 2020, which claims priority to U.S. Provisional Application No. 62/812,139 filed Feb. 28, 2019, which both applications are incorporated herein by reference, in their entirety, for any purpose.

BACKGROUND

Eyewear with interchangeable lenses have been developed to allow a user to easily interchange the lens(es) of the eyewear, such as for aesthetic (e.g., by selecting between differently colored or tinted lenses) and/or functional reasons (e.g., to respond to different light conditions). Eyewear with interchangeable lenses typically include a mechanism to allow the user to remove the currently installed lens and replace it with another lens. In some cases, the lens may be specifically configured for use with a specific eyewear frame, such as by having engagement features (e.g., slots, apertures, or other) configured to engage cooperating engagement features on the frame. This can increase the cost for manufacturing, as the lenses may need to be specifically tailored for the given frame. In other cases, such as when a substantially encircling eyewire retains the lens in place without the need for engagement features on the lens, the lens interchange may be more cumbersome, in some cases requiring additional tools for decoupling and reassembling the lens to the eyewire. Thus, designers and manufacturers of eyewear continue to seek improvements thereto, e.g., to improve the user experience.

BRIEF DESCRIPTION OF THE DRAWINGS

This description will be more fully understood with reference to the following figures in which components may not be drawn to scale, which are presented as various embodiments of the eyewear and eyewear components described herein and should not be construed as a complete depiction of the scope of the present disclosure.

FIG. 5 is an enlarged partial view of the eyewear a portion of the eyewear in FIG. 4A.

FIG. 8C is another cross-sectional view of a portion of the eyewear taken at line 8C-8C in FIG. 2 and showing components of the latch mechanism.

FIG. 15 is a bottom view of the eyewear in FIG. 9.

DETAILED DESCRIPTION

Figure 1:
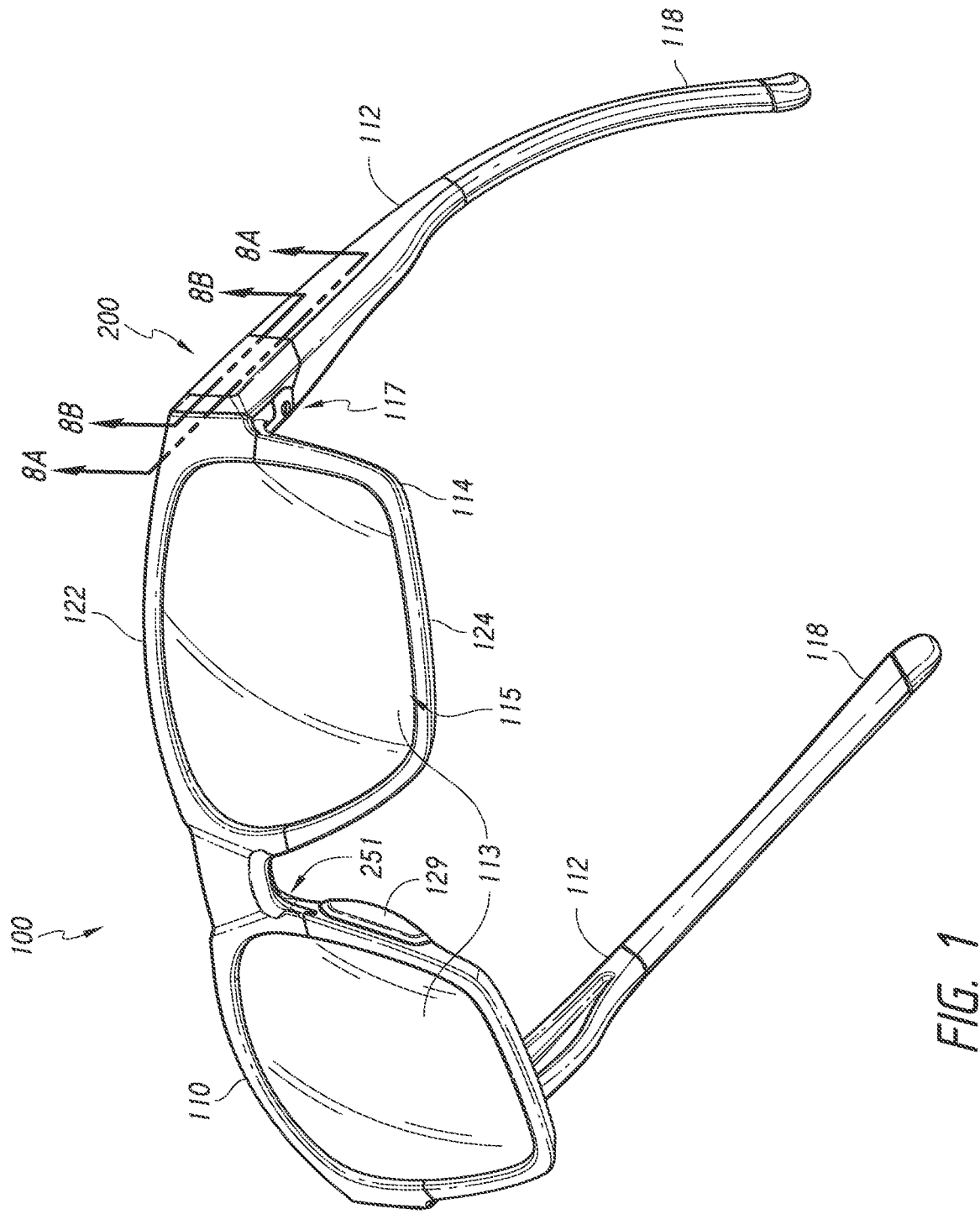
FIG. 1 is an isometric view of an eyewear with a lens interchange system in accordance with some examples of the present disclosure.

Examples of eyewear with removable lenses are described. In some examples, the eyewear may comprise a lens interchange system with a magnetic latch. The lens interchange system may include a first magnetic portion fixed to the frame and a second magnetic portion pivotally coupled to the frame such that the first and second magnetic portions are operable to latch and release a portion of the lens frame to enable the interchange of a lens therein, as described further below. Eyewear according to the present application may be configured as sunglasses or other type of protective eyewear (e.g., for protection in sports, industrial settings, and/or providing ballistic protection), as prescription eyewear or a combination thereof. For example, in some instances, the lens(es) of the eyewear may be configured to provide eye protection (e.g., when engaging in a sport and/or industry), a prescription, and may be further provided with a tint, mirror coating, UV protection, and/or any other suitable compound or coating, e.g., for sun protection and/or aesthetics.

FIGS. 1-8 show views of an eyewear according to the present disclosure. The eyewear 100 in FIGS. 1-8 includes a frame 110 and two lenses 113. In this particular example, the eyewear 100 is of a dual-lens design and thus left and right lens components are provided for placement in front of the left and right eye, respectively, of the user. In other examples, the eyewear may be of the unitary lens configuration where a unitary lens or shield extends across the field of view, or at least a portion thereof, of both of the user's eyes. Additionally and optionally, the lens assembly, whether of a unitary or dual-lens configuration, may include multiple (e.g., two) individual lenses (e.g., an inner and outer lenses spaced apart from one another by an interstitial lens space). Each individual lens may have any suitable properties for a given application. For example, the lens 113 may be shaped or otherwise configured to provide power correction. The lens 113 may include a color (or tint), polarization, mirror coating, anti-reflective, anti-scratch, anti-shatter, and any other suitable treatment as may be appropriate for a given application. In some examples. In examples, the lens may be made from polycarbonate (PC), acrylic, or other suitable material(s) to provide the appropriate optical qualities (e.g., optical clarity, power correction, if any) and meet the other functional requirements of the lens (e.g., ballistic protection, sun protection, etc.). The frame 110 or components thereof may be formed of any suitable material and process. The frame 110 or components thereof may be made from an injection moldable plastic, such as Acrylonitrile Butadiene Styrene (ABS), an ABS/PC blend, High Density Polyethylene (HDPA), Thermoplastic Polyester Resin (PET), nylon, and others. The frame 110 or components thereof may be stamped, die-cut, or produced via a lamination process (e.g., from sheets of cellulose acetate). In yet other examples, the frame 110 or components thereof may be formed using any other suitable forming process or combinations thereof.

The frame 110 includes lens frame or eyewire 114, which is configured to retain the one or more lenses 113 in front of the user's eyes when the eyewear 100 is worn by the user. In the example in FIGS. 1-8, the eyewire 114 includes first and second individual lens retention portions, each defining a respective lens opening 115, for each of the lenses 113. In other examples, a common or shared lens retention portion may retain a single or each of the pair of lenses in place.

Figure 3:
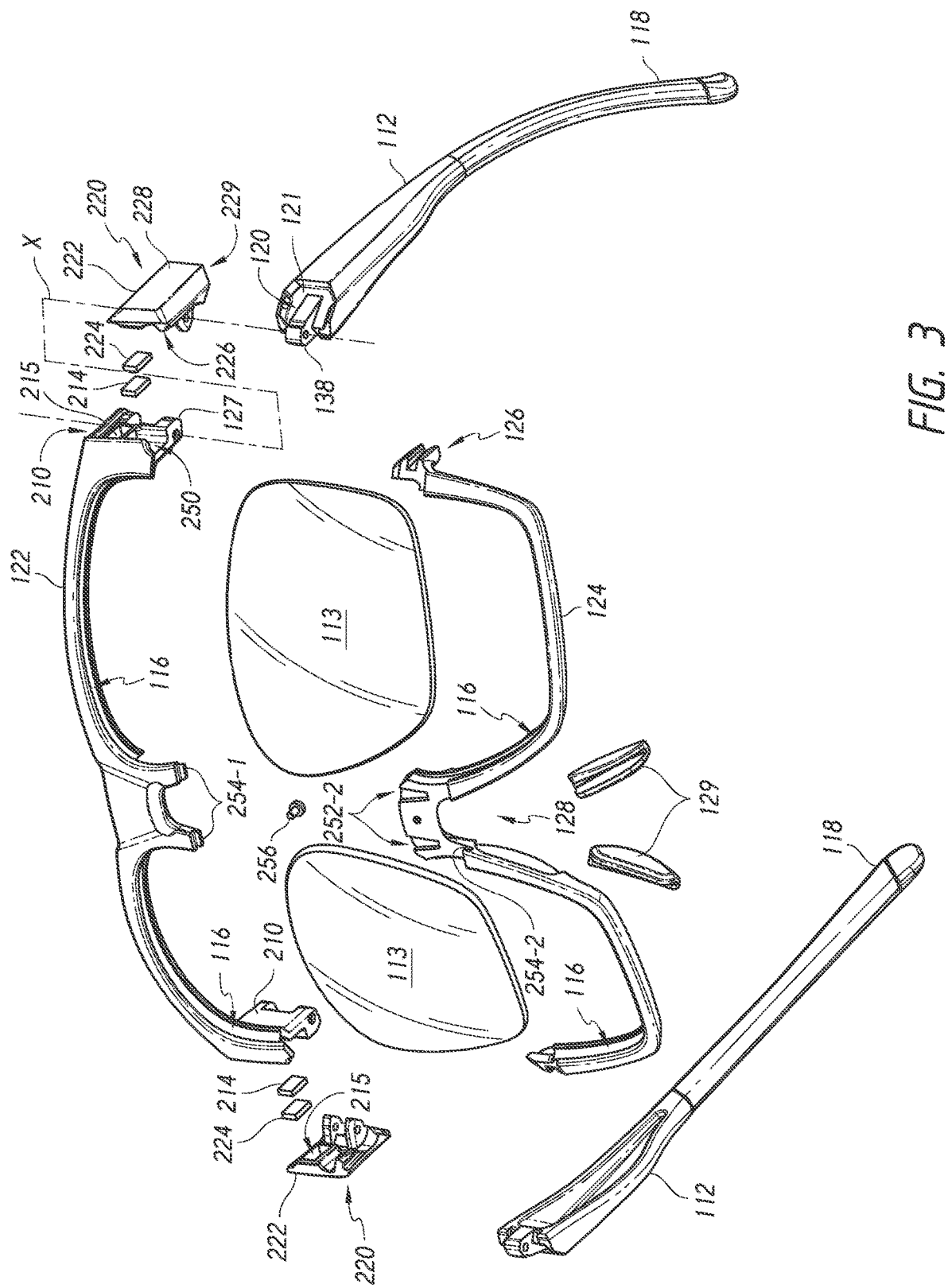
FIG. 3 is an exploded view of the eyewear in FIG. 1.
Figure 4A:
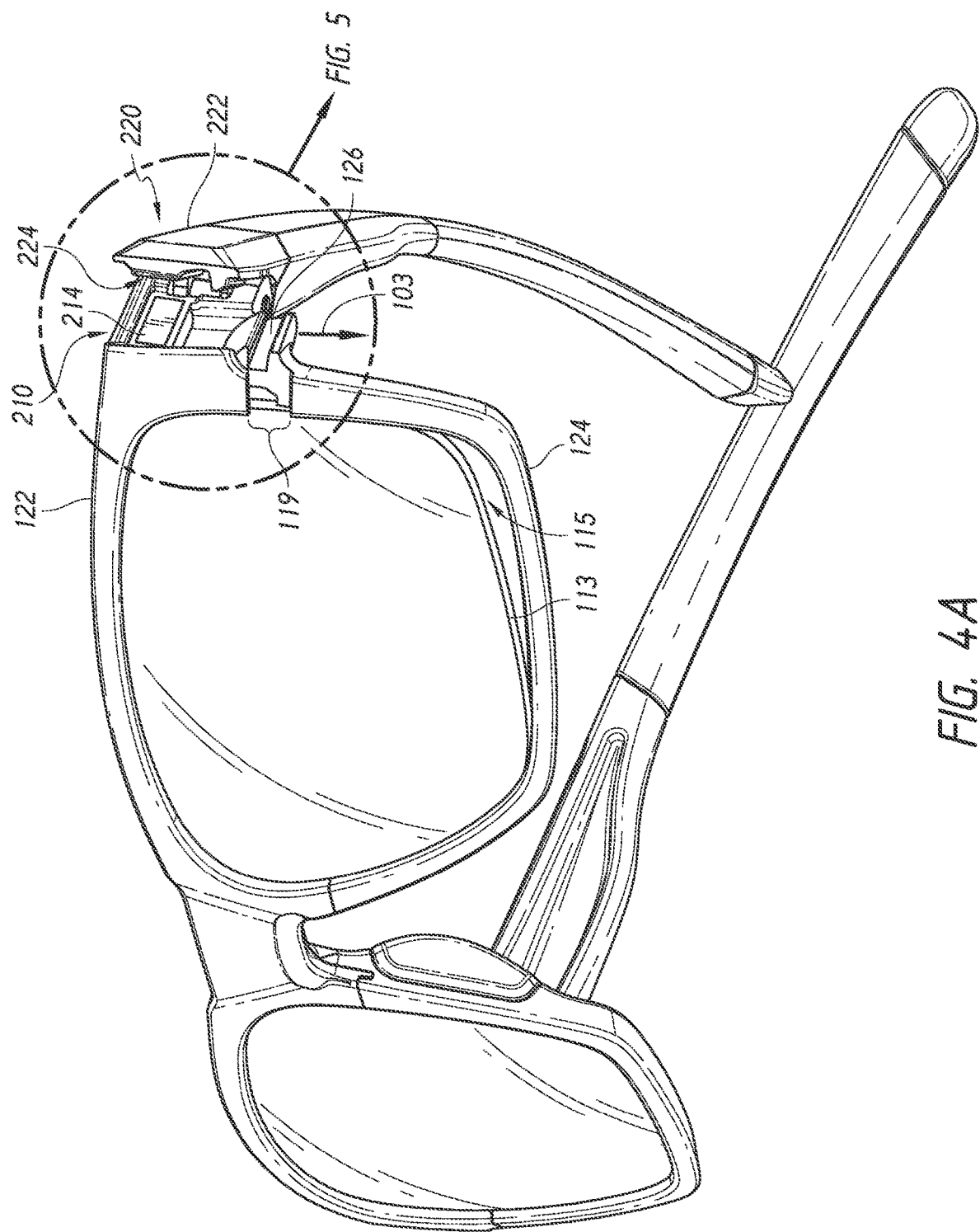
FIG. 4A is another isometric view of the eyewear of FIG. 1 with at least one of the temples in a partially folded position to release the latch mechanism.

As shown e.g., in FIGS. 3 and 4, the lens retention portion(s) of the eyewire 114 may include lens retention feature(s). For example, a groove 116 may be formed on the lens opening side of the eyewire 114. The groove may extend along the full perimeter of the lens opening 115, or a portion thereof, and may be sized to receive at least a portion of the perimeter of the lens 113. When the lens 113 is at least partially captured by the eyewire (e.g., as shown in FIG. 4A), at least a portion of the perimeter of the lens 113 may be seated in the groove 116.

The eyewire 114 may include a first eyewire portion 122, in this case an upper eyewire 122, and a second eyewire portion 124, in this case a lower eyewire 124. The first and second eyewire portions 122 and 124 are operatively coupled to one another to define the first and second lens retention portions for retaining the lens or lenses 113 within the lens opening 115 when the eyewire 114 is in the closed configuration. The eyewire 114 is configured to define at least one gap 119 (see e.g., FIG. 4A) between portions of the eyewire 114 (e.g., between the upper and lower eyewires 122 and 124) which is enlargeable, such as during normal operation of the latch mechanism described herein (see e.g., FIGS. 4A and 4B), to enable removal and/or replacement of one or both of the lenses 113. During normal use, when the latch mechanism is released (unlatched or unlocked), the portions of the eyewear 114 (e.g., the upper and lower eyewires 122 and 124) may be spreadable to enlarge the gap 119 and enable removal and/or insertion of a lens 113 within the lens opening 115. The eyewire 114 may be closed (e.g., re-latched) to reduce or substantially eliminate the gap 119 between the first and second eyewire portions 122 and 124, e.g., for retaining the one or more lenses 113 therebetween. The separation in the eyewire that defines the gap 119 may be provided at a location different from the hinge, such that separating of the first eyewire portion 122 from the second eyewire portion 124, e.g., to enlarge the gap 119, does not affect the operation of the hinge(s) 117 between the eyewire and the temple(s) 112. Operation of the eyewire closure mechanism (also referred to as latch mechanism) does not involve, cause or require disassembly (e.g., the removal of component(s)) of the hinge 117, whereby the hinge(s) 117 remain operational (e.g., for folding and unfolding the temples of the eyewear) in any (e.g., open or unlatched and closed or latched) state of the closure mechanism.

The eyewire 114 may be operatively associated with at least one eyewire closure mechanism (also referred to as latch mechanism), which in this example is implemented as a magnetic latch 200. The magnetic latch 200 is configured to latch or retain the eyewire 114 in the closed configuration in which the eyewire 114 is closed (e.g., the gap 119 is substantially reduced or eliminated). The magnetic latch 200 is further configured to enable easy re-opening of the eyewire 114 for easy and quick lens interchange (e.g., without the use of any specialized equipment or tools). The closure mechanism (e.g., magnetic latch 200) of the example in FIG. 1 is provided proximate to the temple 112 of the eyewear 100, allowing for a gap 119 to be formed and closed at a location near the temple, without affecting the proper operation of the temple hinge. In other examples, a gap in the eyewire 114 and corresponding a closure mechanism may be located elsewhere, such as at a different suitable location along the perimeter of the eyewire 114. For example, the free end of the eyewire portion that separates may be located above the proximal end of the magnetic latch 200 and in some such embodiments, the first and second portions may instead be described as a central, or proximal, eyewire portion and an external, or distal, eyewire portion.

In some embodiments, the eyewear 100 may include a pair of temples 112, which in the example in FIG. 1 are pivotally coupled to the eyewire 114. In other examples, the temples may be fixed to the eyewire or the eyewear may not include temples but may instead use a different mechanism for positioning and securing the eyewire and lens(es) in front of the user's eyes (e.g., using a strap). The temples 112 may have any suitable shape and/or configuration for resting and/or securing the eyewear to the user. For example, the temples 112 may be implemented as generally elongate stem portions, which may, in some cases, curve downward (to fit around a user's ears) and/or curve inwardly toward one another (to warp around the user's head). In some examples, the eyewear 100 may include fit enhancement features, such as temple fit features 118. The temple fit features may include, for example, rubberized temple pads or other suitable treatment on at least a portion of the temple to improve the fit, comfort, and traction between the temples and user's head, and/or for aesthetics. The eyewear 100 may include fit enhancement features, such as nose recess fit features 129, which may be implemented, e.g., a fixed or removable rubberized and/or adjustable nose pads for improving the fit, comfort, and/or traction of the eyewear at the nose recess 128, and/or for aesthetics.

Figure 2:
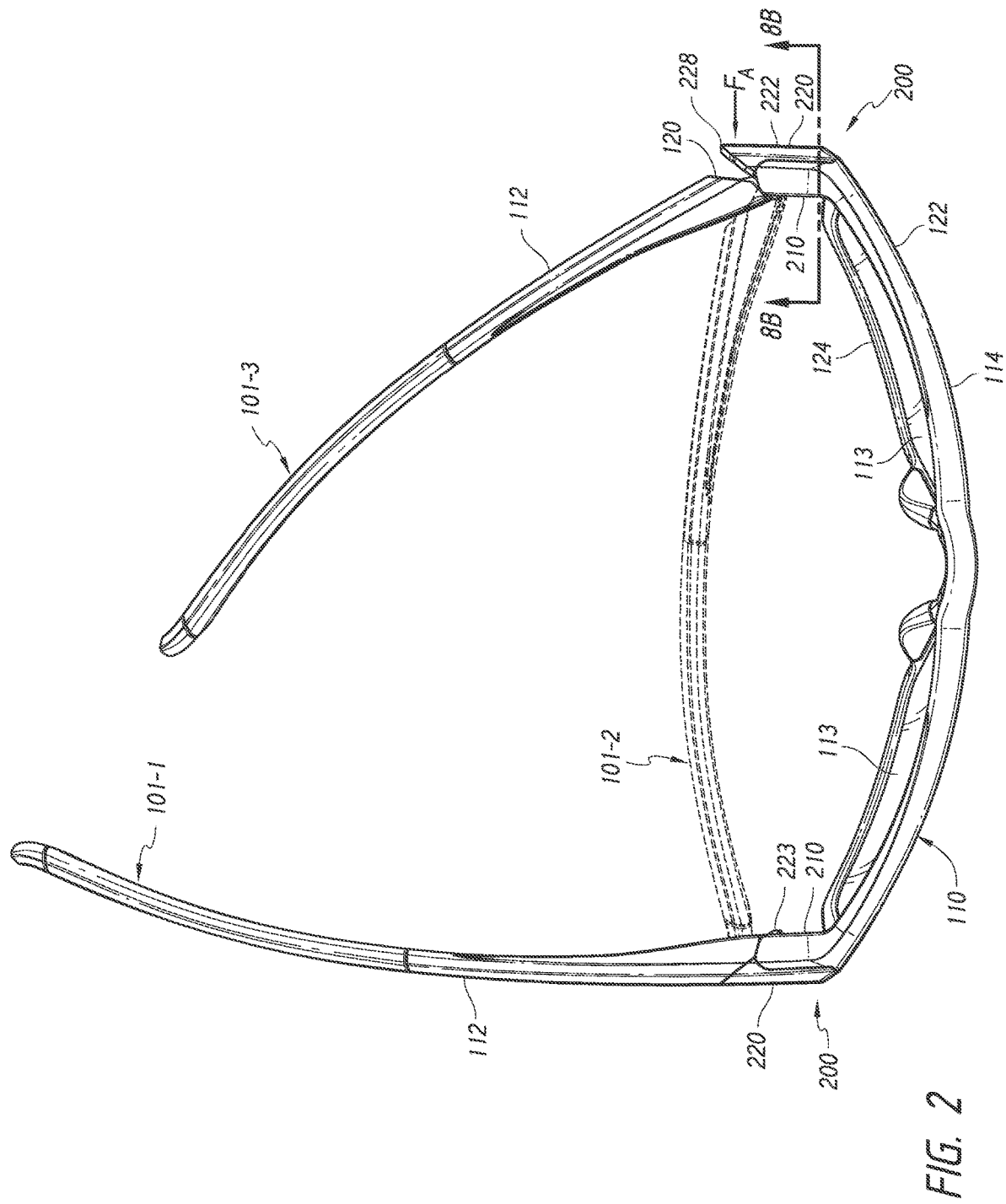
FIG. 2 is a top view of the eyewear in FIG. 1.

As further illustrated in FIG. 2, each of the temples 112 of the eyewear 100 is pivotally coupled to the eyewire 114 via a respective temple hinge 117 such that each of the temples 112 is foldable between an as-worn position 101-1 and a storage position 101-2. The temples 112 may be foldable, during normal use such as during operation of the magnetic latch 200, to any number of intermediate positions between the as-worn position 101-1 and storage position 101-2 including to one or more partially folded positions (e.g., latch release position 101-3). The temple hinge 117 may include one or more detents configured to automatically position and hold, by a slight resistance to rotation of the hinge, the temples at any of the rotational positions of the temple. For example, the temple hinge 117 may be configured to detent the temple to the unfolded (or as-worn) position, to a fully folded (or storage) position, and to one or more partially folded positions such as to a latch release position. The latter may improve the ease with which the user is able to provide the temple in the latch release position and may further facilitate holding the temple in that position as the user manipulates the latch. The detents may be implemented using any suitable mechanism, such as using over-center structures (e.g., a bi- or tri-stability mechanism) operatively arranged around the rotational range of the hinge, or other suitable structures configured to resist the rotation of the temple hinge or bias the hinge to a particular rotational position. In some examples, the unfolded and fully folded positions may be achieved by hard stops, which limit the rotation of the temple hinge to between the unfolded and fully folded position. In some examples, a detent, such as a detent to a partially folded position, may be implemented by a flattened surface between two over-center positions. For example, and referring to FIG. 8A, instead of using a substantially cylindrical hinge barrel, the temple hinge knuckle 138 may include a flattened portion 139 between two radially spaced-apart over center points around the perimeter of the hinge knuckle 138. Each over center point, when interacting with the opposing surface 211 of the frame, may function as an unstable point or location on the hinge knuckle, urging the temple 112 into a rotational position on either side of the unstable point. When the temple 112 is folded back to a position in which the flattened portion 139 abuts the opposing surface 211, the flattened portion 139 may provide a rotationally stable position of the temple 112 and thus function as a detent in the rotation of the temple 112. The unfolded (or as-worn) and fully folded (or storage) position detents may be located on the opposite sides of the respective over-center point from the intermediate detent provided by the flattened portion.

With further reference now to FIGS. 3-6, the magnetic latch 200 includes a first magnetic portion 210, which is fixed to the frame 110 and may thus be also referred to herein as frame magnetic portion 210. In this example, the first magnetic portion 210 is fixed to the upper eyewire 122. By fixed, it is implied that the frame magnetic portion 210 is rigidly attached to the upper eyewire 122, e.g., by being monolithically or integrally formed with the upper eyewire 122 or otherwise rigidly attached by any suitable means such as mechanical fasteners, glue or others that are currently known or later developed. Depending on the desired overall shape of the eyewear 100, the first magnetic portion 210 may be part of or fixed to a portion of the frame 110 that extends at an angle to the arc direction of the lens frame 110, as in the example in FIG. 2. In other examples, the frame and temples may define a generally arcuate shape and the first magnetic portion 210 may be part of or fixed to a portion of the frame 110 that extends substantially along the arc of the lens frame.

The magnetic latch 200 further includes a second magnetic portion 220 pivotally coupled to the frame 110. Each of the first and second magnetic portions 210 and 220, respectively, includes a respective magnetic element 214 and 224. The first and second magnetic elements 214 and 224 may be positioned on the first and second magnetic portions 210 and 220, respectively, to attract one another and urge the second magnetic portion 220 toward the first magnetic portion 210 and thus toward the closed position of the latch 200. In some embodiments, the first and second magnetic elements 214 and 224 may be configured to contact when the latch 200 is closed. In other embodiments, the first and second magnetic elements 214 and 224 may be differently arranged, e.g., one or both may be embedded and/or below the facing surfaces of the first and second magnetic portions such that they do not contact one another as long as the magnetic elements 214 and 224 are configured to provide sufficient magnetic attraction to close the latch 200. In yet other embodiments, one or both of the magnetic elements 214 and 224 may be exposed but spaced apart from one another in the closed position such that the two magnetic elements do not touch, when the latch is closed. The latter arrangement may avoid marring of the exposed surface of the magnetic elements and/or reduce the risk of the magnetic elements becoming dislodges through repeated contact. Any suitable arrangement of the first and second magnetic elements, including using a plurality of magnetic elements for each of the magnetic elements 214 and 224, to provide sufficient magnetic attraction to close the latch 200 may be used.

The first magnetic element 214 is fixed to the first magnetic portion 210. For example, the first magnetic portion 210 may include a first magnet seat 215, which is sized to receive the first magnetic element 214 therein. The magnet seat 215 may be configured such that the first magnetic element 214 is substantially flush with the surface of the first magnetic portion 210 that faces the second magnetic portion 220. In other examples, the first magnetic element 214 may be arranged to protrude above the facing surface of the first magnetic portion 210. In yet other examples, the first magnetic element 214 may be embedded in the first magnetic portion 210 such that the first magnetic element is not exposed. Any other suitable arrangement of the first magnetic element 214 on the first magnetic portion 210 that enables the first magnetic element 214 to attract the second magnetic portion 220 may be used in other examples.

The magnetic elements 214 and 224 may be implemented using magnets (e.g., permanent magnets such as neodymium magnets) for both the first and second magnetic elements 214 and 224, or they may be implemented using a pairing of one or more magnets associated with either the first or second magnetic portion and a ferromagnetic material (e.g., steel or other ferromagnetic metal) on the other one of the two magnetic portions. The use of two magnets in some embodiments may provide additional centering function (e.g., resulting from the magnets' natural tendency to axially align their respective fields to one another), which may enhance the alignment and a tighter closure or fit of the second magnetic portion 220 to the frame 110. In some embodiments, the alignment and tighter fit may be further enhanced by contouring features of the magnetic latch 200. For example, the first magnetic portion 210 may include a depression 248 and the first magnet seat 215 may be located in the depression 248, as shown also in FIG. 8C. The second magnetic portion 220 may be provided with a mound 231, which defines the seat for the second magnetic element 224. The depression 248 may be sized for a cooperating fit with the mount 231 and be therefore configured to receive the mound 231, at least partially, therein. The depression 248 may abut surfaces of the mound 231 around at least a portion of the perimeter of the mound 231 thereby aiding in the positioning of the mound 231, and thus the second magnetic portion 220, with respect to the frame 110 when the latch 220 is closed.

The second magnetic portion 220 may be implemented as a pivotal component (referred to as latch door 222 in the context of the present example), which carries the second magnetic element 224. The latch door 222 is pivotally coupled to the frame 110 such that the latch door 220 can be opened responsive to the application of an actuation force (FA), which may be manually applied, and closed (e.g., automatically) responsive to the magnetic attraction between the first and second magnetic portions 210 and 220. When the eyewear is in the as-worn configuration, the latch door 222 is maintained in the closed position as result of the magnetic attraction between the first and second magnetic portions 210 and 220. Additionally and optionally, when the eyewear is in the as-worn configuration, the latch door 222 may be locked into the closed position by a lock out mechanism, described further below.

In some embodiments, as in the example in FIG. 3, the pivot axis of the latch door 220 may coincide with the temple hinge axis X. Using a common pivot axis between the latch door and the hinge may provide a more compact design of the lens interchange mechanism. It is contemplated however, that in other embodiments, the temples and latch door may pivot at different axes while still provide the features and functionality described herein. For example, the pivot axis for the latch door may be substantially parallel to the hinge axis X by offset from the hinge axis X, e.g., toward the front side of the eyewear 100. In other examples, the two axes may be spaced apart and be non-parallel, non-intersecting axes (e.g., skew axes). In yet other example, the latch door may pivot about an axis that is oriented substantially horizontally such that the latch door swings up and down to open and close. Any other suitable arrangement of the pivotal component of the second magnetic portion 220 may be used as long as the first and second magnetic portions 210 and 220, respectively, are configured to magnetically attract one another such that the latch door 222 can be retained in a closed position as a result of the magnetic attraction between the first and second magnetic portions.

The magnetic latch 200 includes a latch cavity 250 configured to receive a latch catch 126. The latch cavity 250 may be defined in part by the first and second magnetic portions 210 and 220, respectively. For example, the latch cavity 250 may be provided in part by a recess 252 (see FIG. 5) formed in one of the first magnetic portion 210, e.g., below the magnet seat 215, and further in part by the latch door 222. In other examples, the recess 252 may instead be located on the latch door 222. The cavity 250 may be sized and shaped to receive the latch catch 126.

Figure 6:
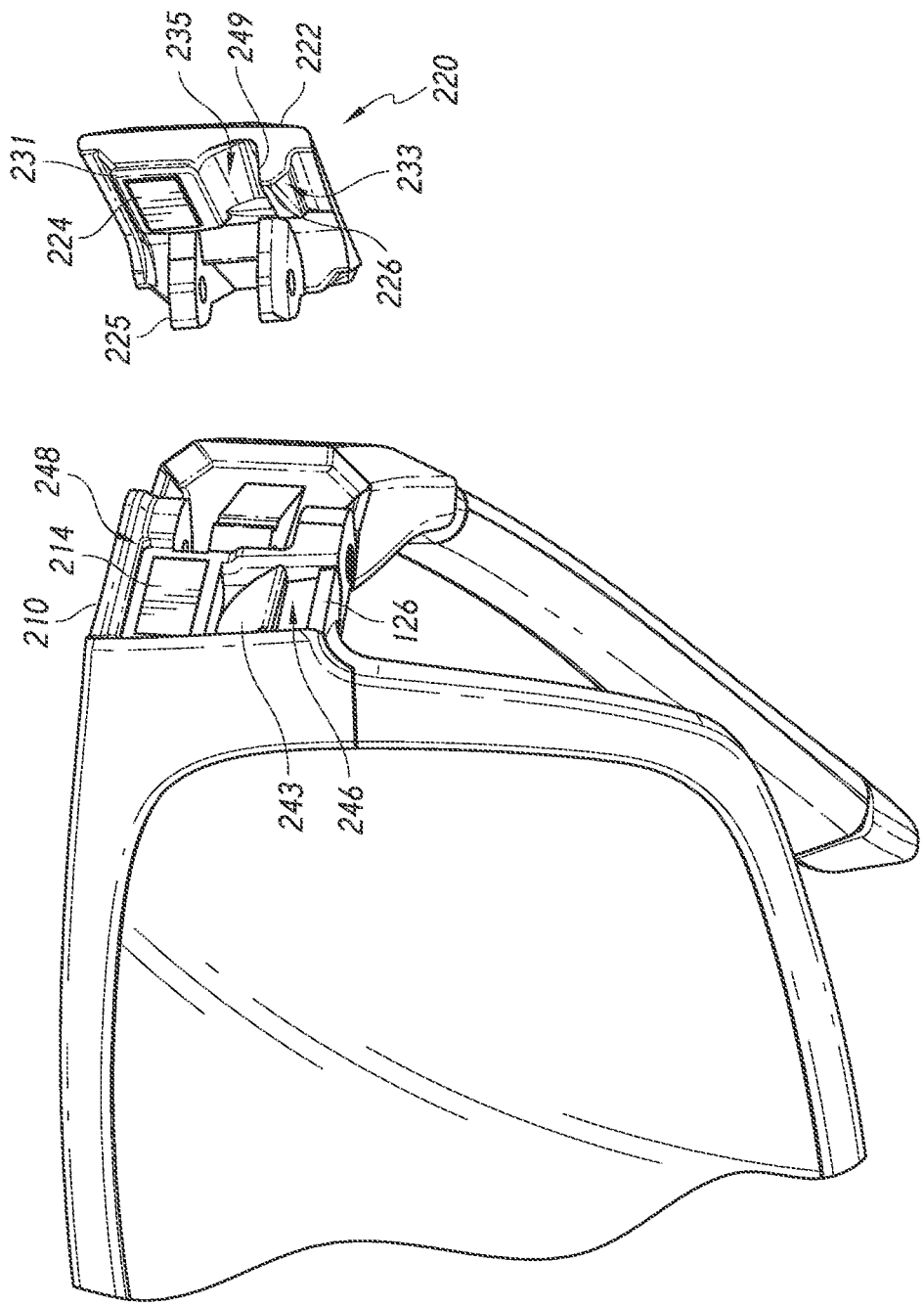
FIG. 6 is another partial view of a portion of the eyewear in FIG. 4A showing the latch door exploded away from the eyewear frame to illustrate components thereof.

The latch catch 126 and latch door 222 are configured to engage one another to retain the eyewire 114 in the closed position when the lower eyewire 124 is in the up position (with the latch catch 126 inserted into the cavity 250, as shown in FIG. 6) and the latch door 222 is closed. To that end, the latch catch 126 and latch door 222 may include cooperating features (e.g., interlocking features), which mechanically retain the latch catch 126 to the latch door 222 thereby mechanically locking the lower eyewire 124 in the closed position when both the lower eyewire 124 is provided in the up position and the magnetic latch 200 is closed. For example, the latch catch 126 and the latch door 222 may include opposing ledges 239 and 249, respectively, which abut one another thereby mechanically preventing removal of the latch catch 126 from the cavity 250 when the latch door 222 is closed. The ledge 239 may be provided by a downward facing wall on the latch catch 126, while the ledge 249 may be provided by an upward facing wall on the latch door 222. The terms upward and downward as used herein assume the eyewear is oriented as would be worn by the user and are thus arbitrary, used solely for the purpose of illustrating that the two walls or ledges face in opposite direction, and do not otherwise limit the embodiments of the invention. The upward facing wall providing the ledge 249 may be part of a structure (e.g., protrusion 226) extending from the latch door 222 toward the first magnetic portion 210. The protrusion 226 may be spaced apart from the mound 231 by a cavity 235 sized to accommodate the wedge 243 of the latch catch 126. In some examples, the cavity 235 may have a substantially similar cross-sectional geometry as the wedge 243 for a cooperating fit therewith. In other examples, the cavity 235 may loosely accommodate the wedge, with a void remaining between the wedge 243 and the walls of the cavity 235, as shown in FIG. 8C. The ledge 239 may be provided by one of the opposing walls of a channel or slot 246 formed in the latch catch 126 and configured to receive the protrusion 226.

In use, removal and installation of a lens may be easily achieved by operation of the closure mechanism (e.g., magnetic latch 200) of the present disclosure without the use of any specialized equipment or tools. To remove the lens 113, the temple 112 may be folded, at least partially, towards the storage position. For example, as shown in FIG. 2, the temple may be provided into the latch release position 101-3 to expose the lever portion 228 of the latch door 222. In some embodiments, when the temple 112 is so folded into a latch release position, rotation of the temple 112 out of that position may be resisted by a temple hinge detent such that the user need not hold the temple 112 into the latch release position while operating the latch mechanism. An actuation force FA may be applied by the user to the now exposed lever portion 228 of the latch door 222, as shown in FIG. 2. The lever portion 228 extends in an opposite direction from the pivot or fulcrum of the latch door 222 than the portion of the latch door, which supports the second magnetic element 224. Thus, the application of an actuation force to the lever portion 228 causes the latch door to pivot about its fulcrum causing the first and second magnetic portions 210 and 220 to separate against the magnetic attraction between the first and second magnetic elements 214 and 224 thereby providing the latch 200 into the open configuration (e.g., see FIG. 4A), which consequently causes the eyewire to open (i.e., the free end of the lower eyewire, which carries the latch catch decouples or separates from the upper eyewire).

Figure 4B:
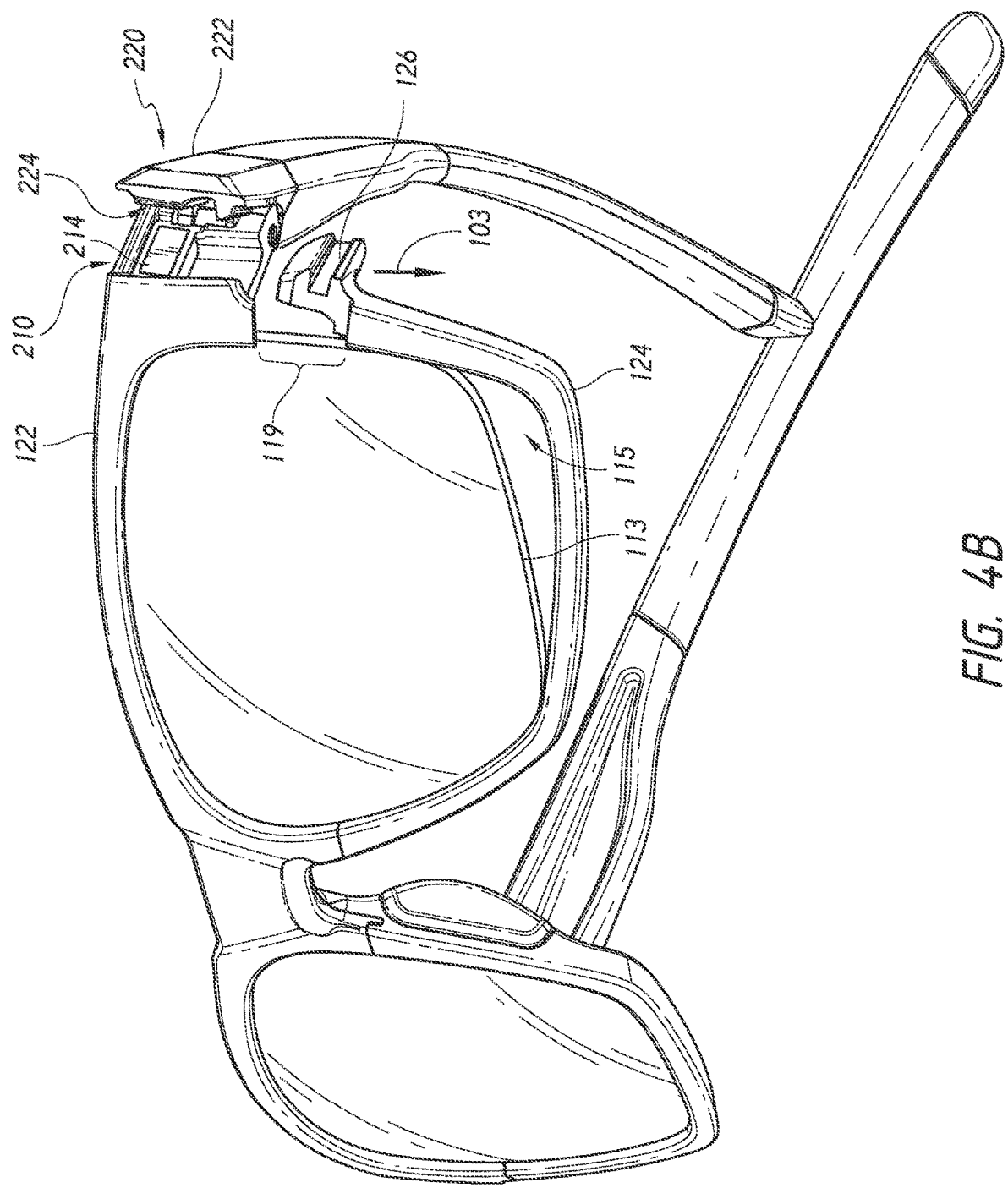
FIG. 4B is another isometric similar to the view in FIG. 4A but with the separation between the eyewire portions enlarged to facilitate removal of the lens.

The eyewire 114 may be preloaded to spring to a partially open configuration (e.g., as shown in FIG. 4A) when the latch is released. In some examples, the eyewire 114, or at least a portion thereof, may be formed of a material that returns to a nominal unloaded state. For example, the eyewire 114 or a portion thereof (e.g., the lower eyewire 124) may be formed of a plastic material into the shape corresponding to the partially open configuration of the eyewire, such that when no force is being applied to the lower eyewire (e.g., to hold it closed via the latch), the lower eyewire may naturally return to the partially open configuration. In other examples, the eyewire or portion thereof, which is preloaded to the partially open configuration may be formed of a different suitable material (e.g., a metal, a composite, or others). The preload (or spring bias) in the eyewire 114 may be sufficiently high to allow the eyewire 114 to spring open to a partially open configuration, in which the latch catch 126 is released (e.g., not mechanically locked in and at least partially removed from the latch cavity). The preload (or spring bias) may be sufficiently low such upon release of the latch 200, the lens 113 may remain at least partially captured in the lens opening 115 to prevent the lens 113 from falling out of the frame 110 until the user further enlarges the lens opening 115 (e.g., as shown in FIG. 4B) and/or manually removes the lens 113 from the frame 110. In examples herein, the opening of the eyewire 114 (e.g., the enlarging of the gap 119 to facilitate removal and installation of a lens) may be achieved through elastic deformation of the eyewire 114, e.g., in this example by elastically deforming the lower eyewire 124 away from the upper eyewire 122.

As illustrated in FIG. B, once the latch catch 126 has been released, the gap 119 and correspondingly the lens opening 115 may be further enlarged such as by manipulating the free end of the lower eyewire 124 away from the latch mechanism 200 (e.g., in the direction 103) until the lens 113 can be removed from the frame 110 and/or to enlarge the opening 115 for insertion of a lens 113 therein. Once the latch catch 126 has been released from the latch, the user may remove the force from the lever and thus release the latch door to close. Magnetic attraction between the latch door 222 and the frame magnetic portion 210 may simplify the operation of the latch 200 in that the latch door 222 need not be manually opened and close when re-installing or re-latching the lower eyewire 124. Once the latch door 222 has been released and allowed to return to the closed position, to re-latch the eyewire 114, the user simply applies a squeezing force on the top and bottom of the eyewire to force the lower eyewire 124 into the closed position.

Figure 7:
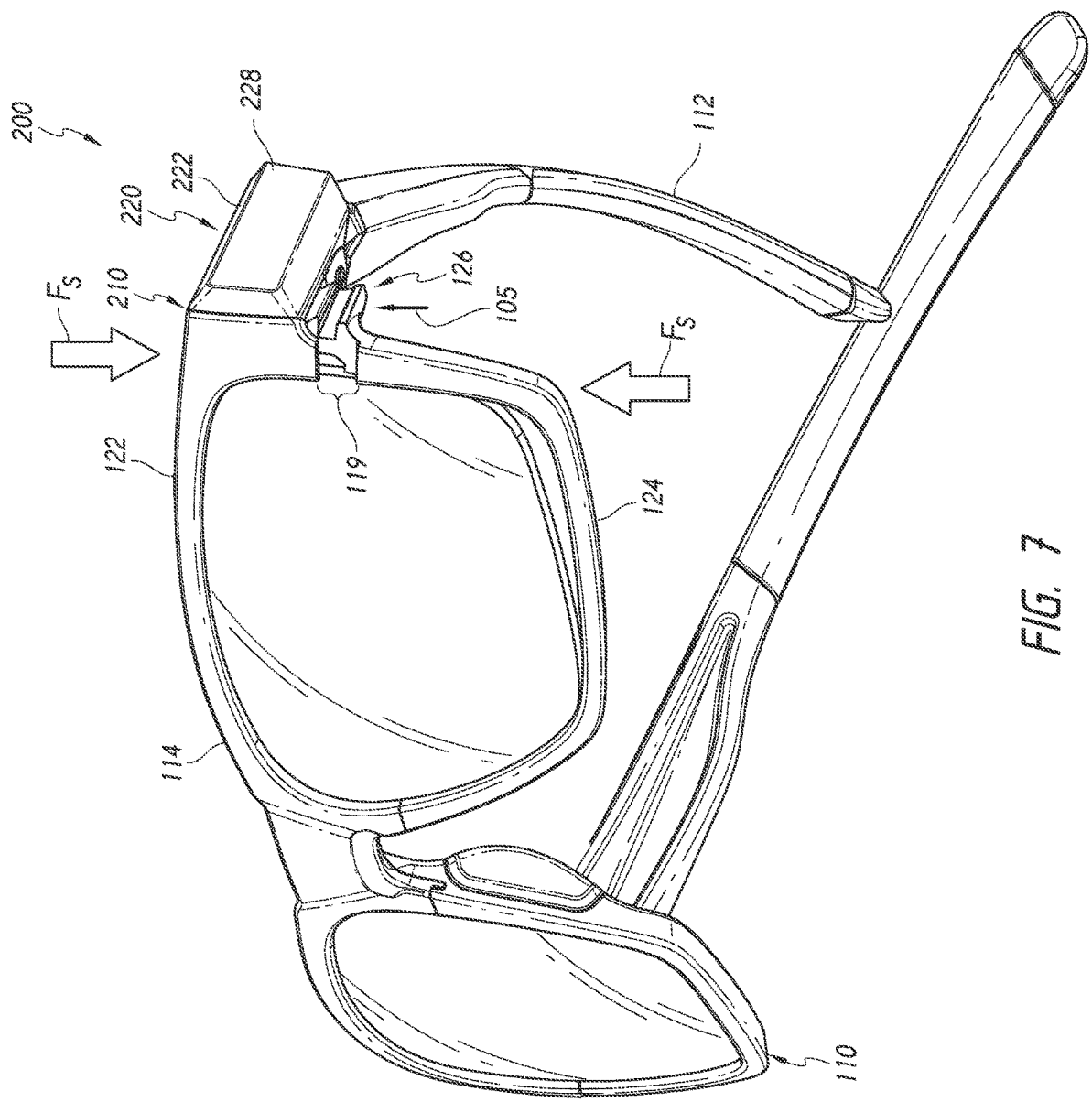
FIG. 7 is yet another isometric view of the eyewear in FIG. 4A illustrating a re-latching of the eyewire.
Figure 8A:
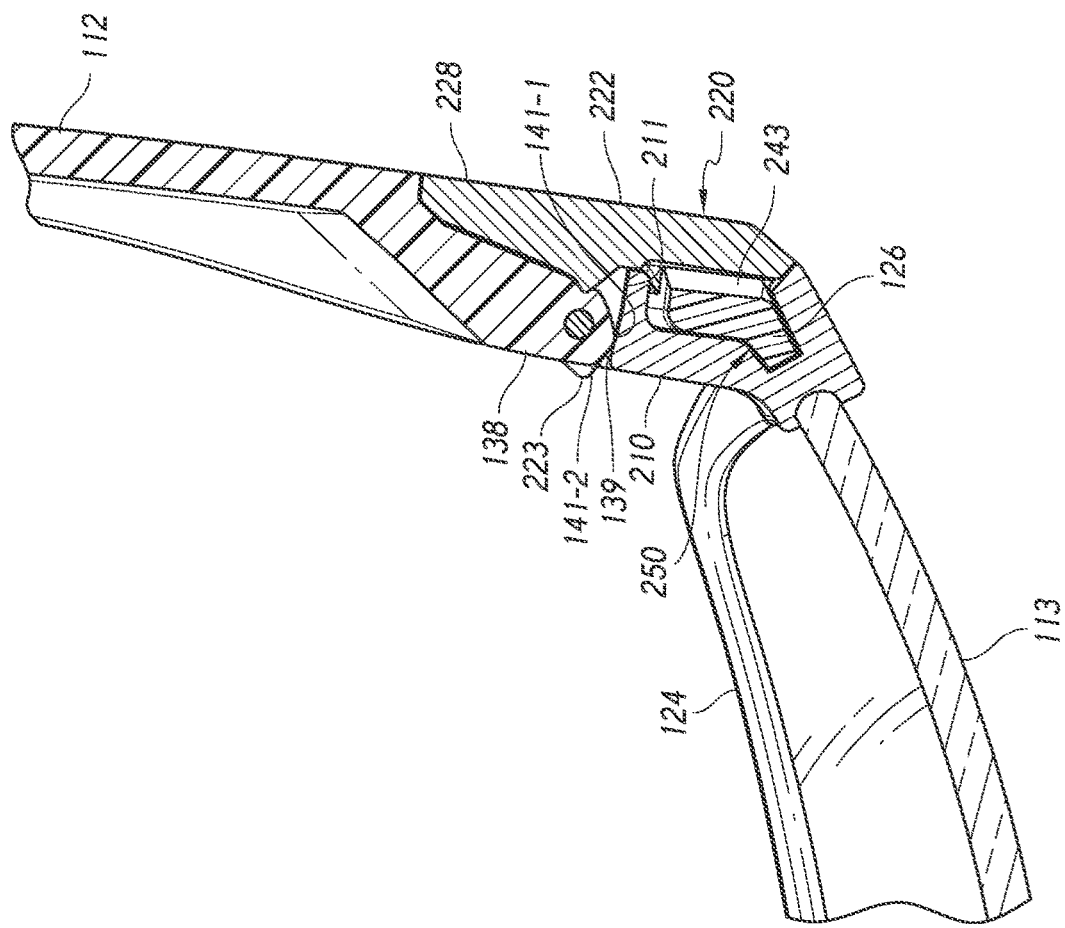
FIG. 8A is a cross-sectional view of a portion of the eyewear taken at line 8A-8A in FIG. 1 and showing components of the latch mechanism.
Figure 8B:
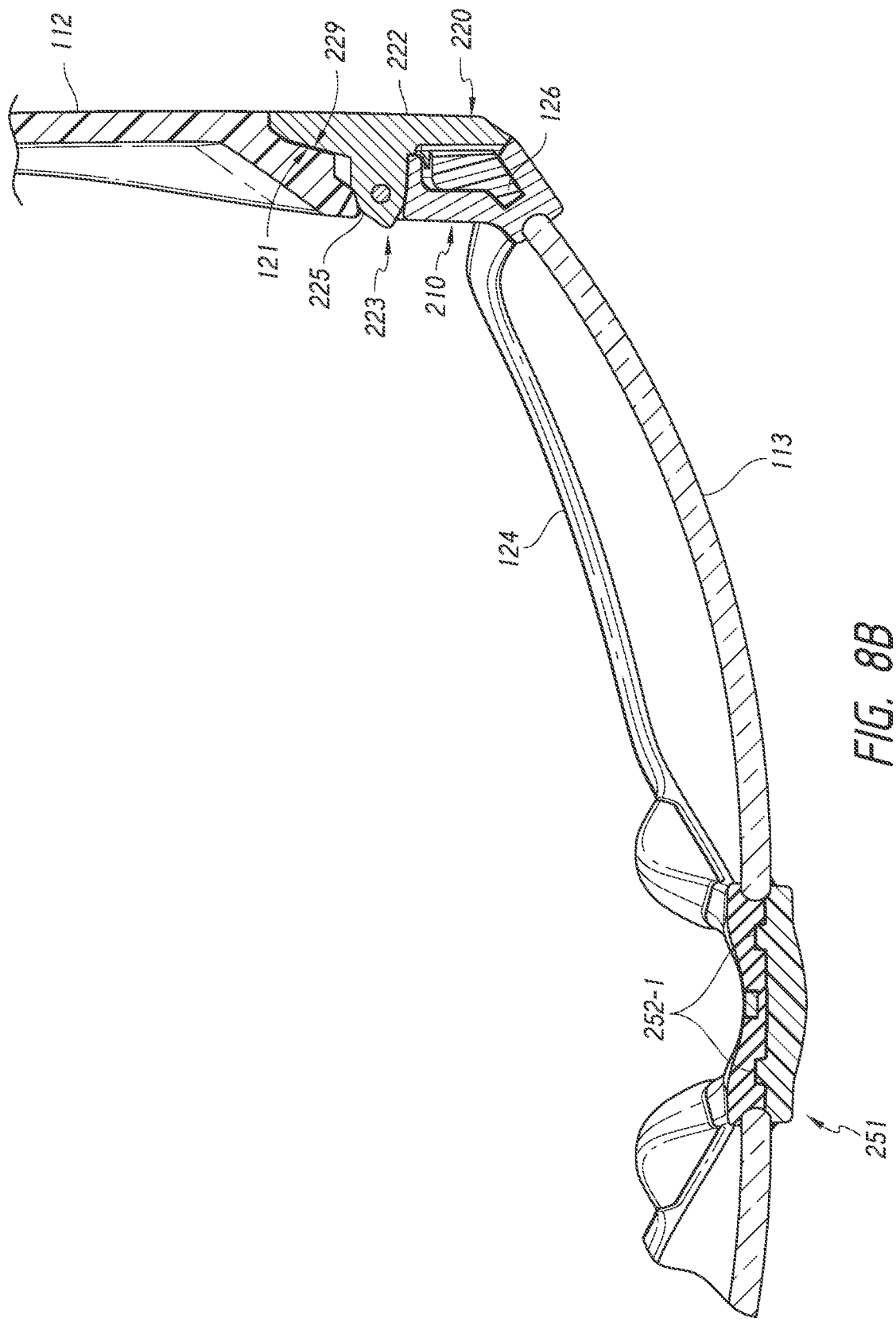
FIG. 8B is another cross-sectional view of a portion of the eyewear taken at line 8B-8B in FIG. 2 and showing components of the latch mechanism.
Figure 9:
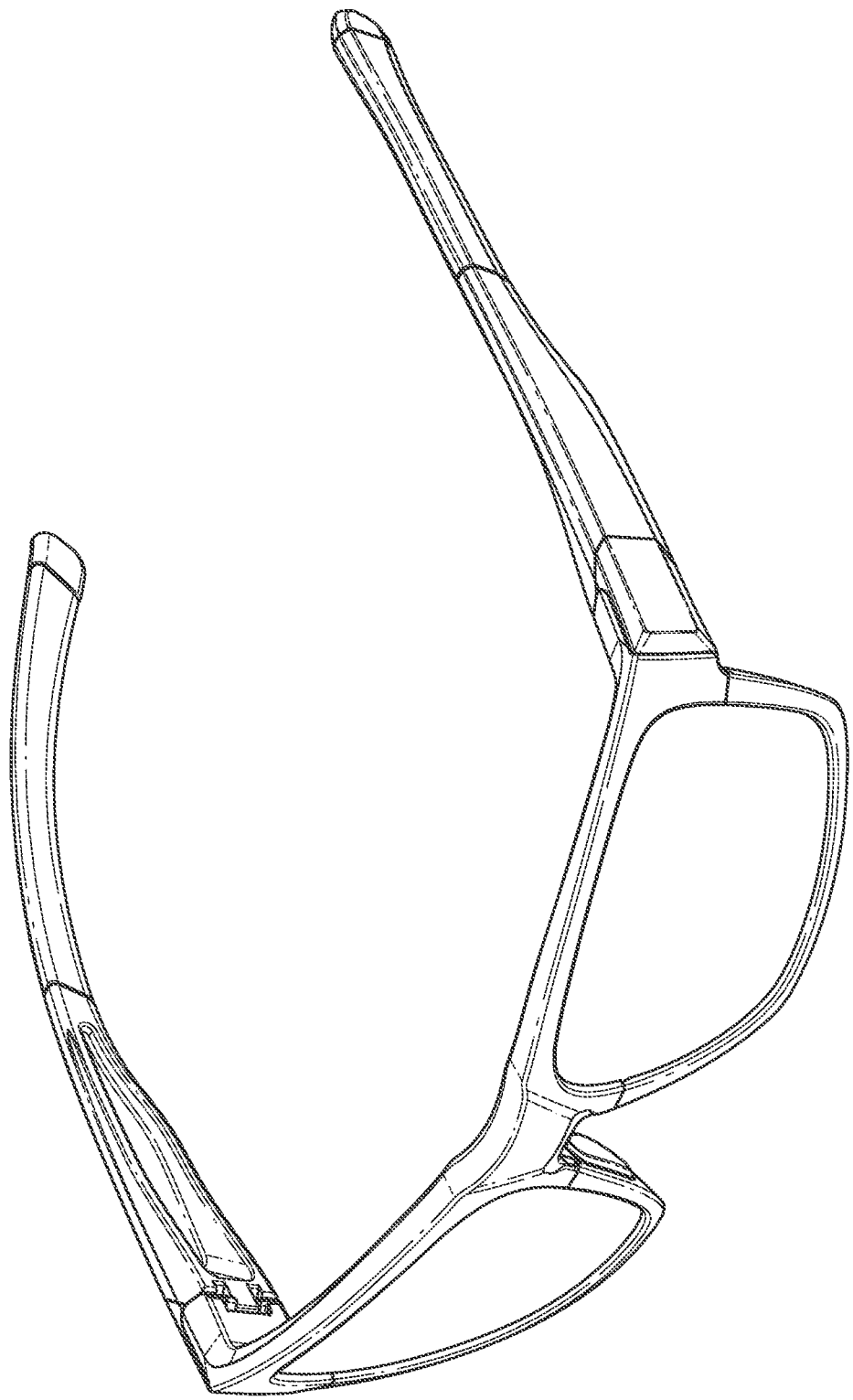
FIG. 9 is another isometric view of an eyewear according to the present disclosure.
Figure 10:
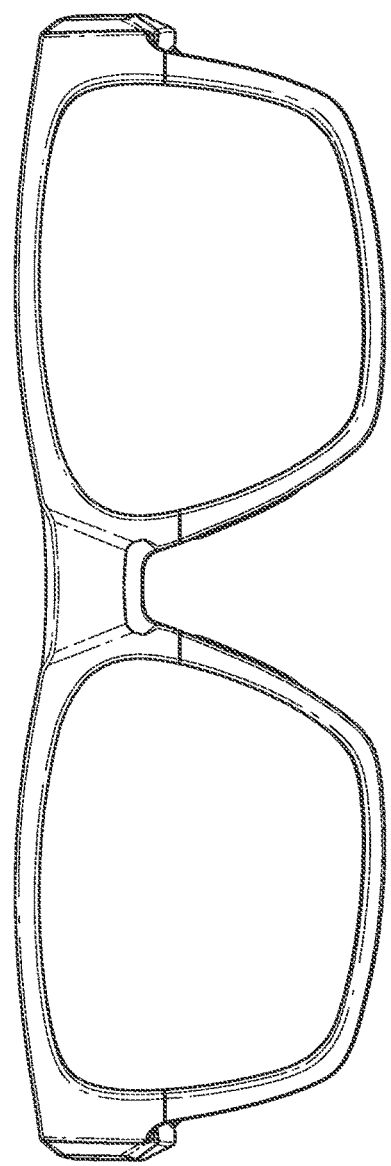
FIG. 10 is a front view of the eyewear in FIG. 9.
Figure 11:
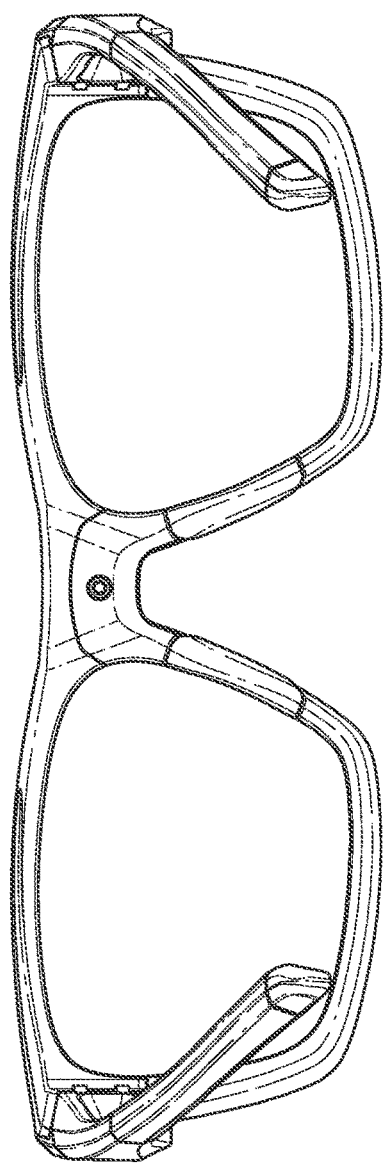
FIG. 11 is a rear view of the eyewear in FIG. 9.
Figure 12:
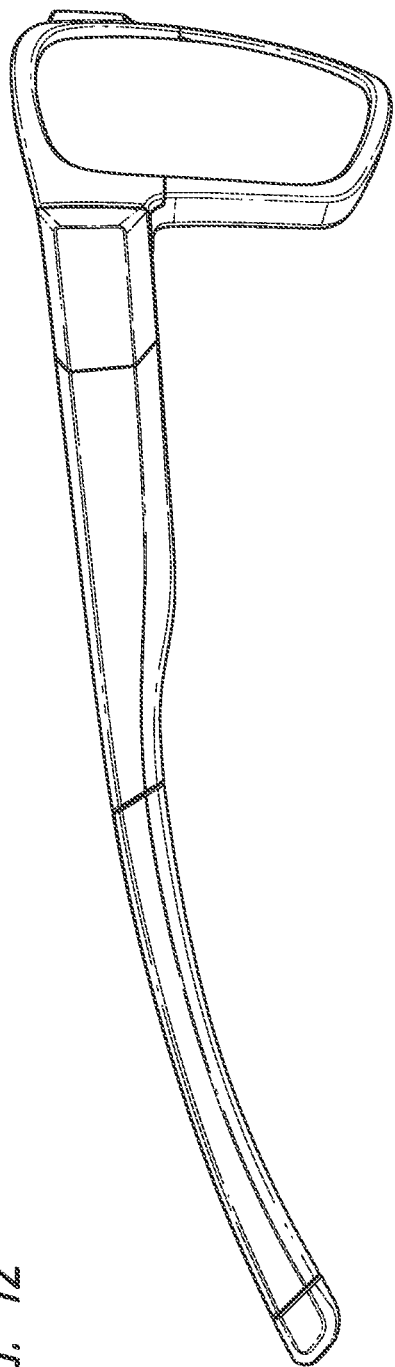
FIG. 12 is a left side view of the eyewear in FIG. 9.
Figure 13:
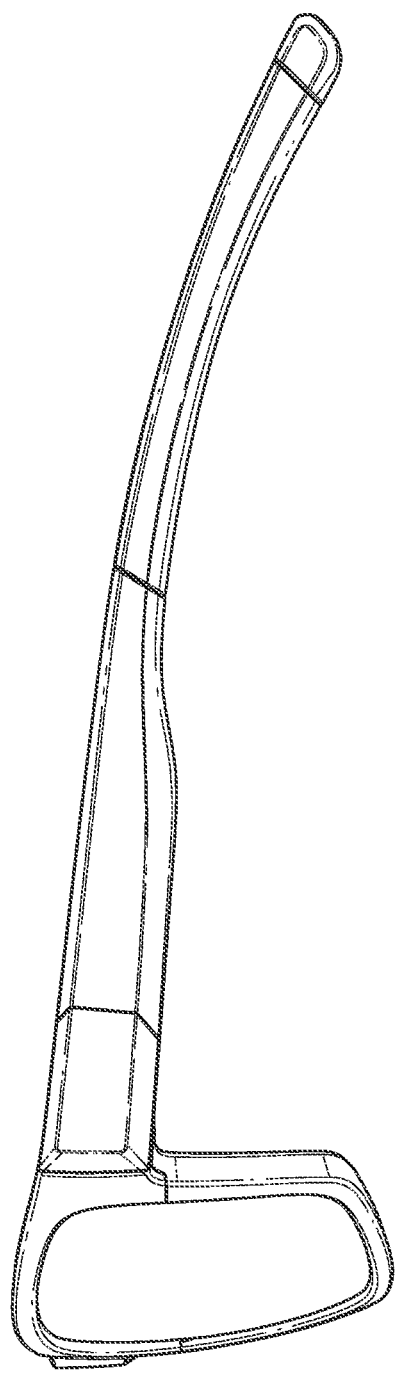
FIG. 13 is a right side view of the eyewear in FIG. 9.
Figure 14:
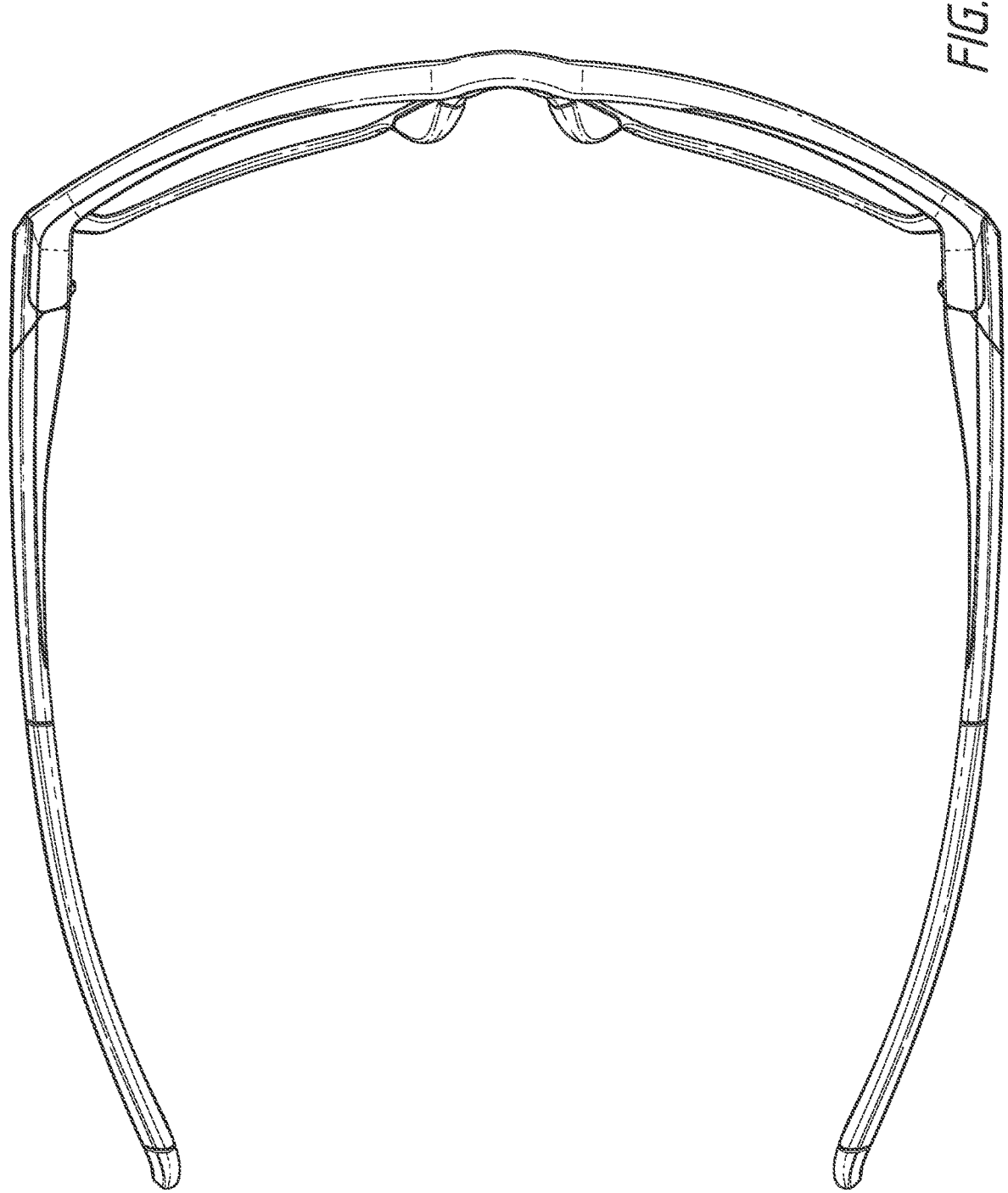
FIG. 14 is a top view the eyewear in FIG. 9.

To install a lens to the frame 110, a lens 113 may be placed in the lens opening such as aligning the lens with and inserting a perimeter portion of the lens into at least a portion of the groove(s) 116. For example, the user may align and insert the upper perimeter of the lens 113 into the groove 116 of the upper eyewire 122, as shown in FIG. 7. Once so positioned, the latch catch 126 may be aligned with the opening of the latch cavity 250 and a squeezing force $F_S$ may be applied to the top and bottom of the eyewire 114, e.g., as shown in FIG. 7, to cause the latch catch 126 to move in a general upward direction 105 and be inserted into the latch cavity 250. The squeezing force $F_S$ may be applied by applying a force to the top eyewire while concurrently applying a counter force to the bottom eyewire. The force and counter force may be applied to respective portions of the upper and lower eyewire such that the forces act through a line that passes through or is as close as possible to the latch cavity, which may reduce the moment and thus distortion on the frame during the automatic re-latching of the closure mechanism. The application of the force $F_S$ may cause the first and second magnetic portions 210 and 220 to automatically temporarily separate to allow the latch catch 126 to be inserted into the cavity 250, the latch 200 being configured to automatically close, after the latch catch 126 has been inserted into the cavity 250, responsive to the magnetic attraction of the first and second magnetic portions 210 and 220. In this example, the operation (e.g., opening and closing) of the latch door 222 is independent of the position of the lower eyewire 124 and latch catch 126, and thus closing of the latch door 222 does not necessarily result in closing of the eyewire 114 unless the latch catch 126 is operatively positioned within the latch cavity 250. In other words, the latch door 222 is operable to close via magnetic attraction even if the latch catch 126 is not engaged and the lens opening 115 is in the gapped configuration. The absence of the latch catch from the latch cavity does not prevent closing of the latch door.

To facilitate the automatic temporary opening of the latch 200 (i.e. without manually separating the magnetic portions) during re-latching of the eyewire 114, the magnetic latch 200 may be provided with at least one ramp that assists with the temporary opening of the latch. The ramp may be located either on a surface of the latch cavity 250 or on the free end of the separable eyewire (e.g., the lower eyewire 124). In the illustrated example (e.g., in FIG. 5), the at least one ramp is provided on the free end of the separable eyewire, such as by shaping a leading portion of the latch catch 126 as a wedge 243. The inclined leading surface of the wedge 243 may cooperate with the latch door 222 to temporarily open the latch door 222 during insertion of the latch catch 126 within the latch cavity 250. In other embodiments, the ramp may be located elsewhere, for example on the latch door itself and/or on the wall of the latch cavity opposite the latch door. In embodiments in which the ramp is provided by the latch cavity, the free end of the separable eyewire may be wedge shaped or it may be blunt. In some embodiments, a plurality of cooperating ramps may be used. For example, a ramp (e.g., in the form of a wedge) may be provided on the latch catch, which cooperates with a ramp 233 on the latch door 222 (or on the opposite wall of the latch cavity) to push on the latch door 222, temporarily separating the magnetic elements 214 and 224 to allow the latch catch 126 to slide into the cavity 250. Once the latch catch 126 has been operatively inserted into the cavity 250, in this case with the protrusion 226 of the latch door 222 received in the cooperating slot 246 of the latch catch, the latch 200 automatically returns to the closed position by the magnetic attraction of the first and second magnetic elements 214 and 224. In some embodiments, the incline of the leading surface of the wedge 243 may be about 45 degrees, or in the range of about 30 degrees to about 55 degrees. In some embodiments, the incline may be shallower than 30 degrees or steeper than 55 degrees as long as there is sufficient inclination to enable the leading portion of the latch catch 126 to act as a wedge to separate the first and second magnetic portions 210 and 220 as the latch catch moves into the cavity 250.

In some embodiments, the closure mechanism may be provided with a lock out feature. For example, the magnetic latch 200 may be configured such that a locking feature 120 operatively engages the lever 228 when the temple 112 is in the unfolded or as-worn position to prevent pivoting of the latch door 222 and thus prevent separation of the first and second magnetic portions 210 and 220. In an example in which the latch door is pivotally coupled to the frame at the temple hinge, the locking feature 120 may be provided by a lock out surface 121 of the temple (see e.g., FIG. 3). Referring to the example in FIG. 8C, a portion of the lever 228 (e., surface 229) may be configured to engage (e.g., abut) a portion of the temple 112 (e.g., locking surface 121), such that rotation of the latch door 222 is prevented when the temple 112 is in the as-worn position. In other examples, the lock out feature may be differently implemented, such as by using other suitable blocking surfaces positioned differently on the temple, latch door, or other portions of the frame.

In some examples, the rotation of the latch door 222 may be limited, for example by a hard stop 223. The hard stop 223 may be implemented as a protrusion on the outward surface of the latch door knuckle 225. The protrusion 223 may extend radially outward from a nominal cylindrical profile of the outward surface of the hinge knuckle 225 (indicated in broken line in FIG. 8B) by a sufficient amount to prevent rotation of the latch door beyond the location of the protrusion 223. Limiting rotation of the latch door 222 to an amount, less that the full rotational range of the temple may maintain the two magnetic portions 210 and 220 is magnetic attraction range thus enabling the latch door to automatically return to closed position by magnetic attraction rather than requiring manual closing of the latch door. In other words, a hard stop may be used to limit the separation of the two magnetic portions to a distance within which sufficient magnetic attraction is exerted between the two magnetic elements to automatically return the latch door to the closed position upon release of the manual opening force.

For ease of manufacturability, the eyewire 114 may be formed, in some examples, as two or more separate components that are assembled to provide the eyewear in FIG. 1. For example, the upper eyewire 122 and the lower eyewire 124 may be manufactured (e.g., injection molded or laminated) separately and the two eyewire components may be rigidly coupled to one another to form the eyewire 114. In the present example, the upper eyewire 122 is joined to the lower eyewire 124 at the nose recess, however in other examples the eyewire portions may be joined at different suitable location(s). In yet other examples, with the exception of the seam at the closure mechanism, the eyewire may be substantially seamless (e.g., when manufactured as a single component). In the present example, the upper and lower eyewires are joined by a lap joint 251 at the nose recess 128, which is further reinforced by tongue and groove features 254-1 and 254-2 in the direction of the lap joint and tongue and groove features 252-1 (see FIG. 8B) and 252-2 in the thickness direction of the lap joint. Any other suitable joint may be used. Additionally or alternatively, the upper and lower eyewire may be joined by any other suitable means, such as via mechanical fasteners 256, adhesives, laser welding, etc., currently known or later developed. While illustrating an example in which the upper and lower eyewires 122 and 124, respectively, are formed as separate components, it will be understood that in normal use the upper and lower eyewires 122 and 124 remain attached to one another but for the portion of the lower eyewire 124, which is separable to form the gap 119. In embodiments of the present disclosure, the upper and lower eyewires 122 and 1254 may be integrally formed as a single or monolithic component. The latch door 222 and the temples 112, in examples in which they are pivotally coupled to the eyewire 114, may also be assembled to the eyewire 114, e.g., by aligning the temple and latch door hinge knuckles 138 and 225, respectively, to the eyewire hinge knuckle 127 and securing a pin (e.g., a fastener) through the axially aligned openings of the hinge knuckles. In other embodiments, in which the temple and latch do not share a common pivot axis the individual pivotal joints may be separately assembled.

FIGS. 9-15 show additional views including an isometric, front, rear, left, right, top and bottom views, of an eyewear according to the present disclosure.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use unless specifically set forth in the claims or is otherwise implied by the present disclosure. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An eyewear comprising:
   a frame comprising an eyewire that couples a lens to the frame, the eyewire including a first eyewire portion that extends along only a first portion of a perimeter of the lens;
   a second eyewire portion which extends only along a second portion of the perimeter of the lens different from the first portion, the first and second eyewire portions together encircling the lens and coupling the lens to the frame, and the second eyewire portion having a free end that separates from the first eyewire portion to enable removal of the lens from the frame;
   a temple coupled to the eyewire and pivotable between a storage position and an as-worn position; and
   a magnetic latch comprising a magnetic latch door pivotally coupled to the eyewire and operable, when the magnetic latch door is closed, to couple the free end of the second eyewire portion to the first eyewire portion to provide the eyewire in a closed configuration in which the lens is coupled to the frame, wherein the magnetic latch defines a latch cavity, wherein the second eyewire comprises a latch catch on the free end of the second eyewire, and wherein the latch catch is configured to interlock with the latch door to couple the free end of the second eyewire to the first eyewire thereby coupling the lens to the frame, the magnetic latch further comprising a ramp on one of the free end of the second eyewire portion or the latch door, the ramp being configured to cause the latch door to open during insertion of the latch catch within the latch cavity in response to pressing the free end of the second eyewire portion toward the latch cavity.

2. The eyewear of claim 1, wherein a pivot axis of the latch door coincides with a pivot axis of the temple hinge.

3. The eyewear of claim 1, wherein the temple remains attached to the frame during opening and closing of the magnetic latch.

4. The eyewear of claim 1, wherein the magnetic latch is configured to retain the lens to the frame.

5. The eyewear of claim 4, wherein the magnetic latch comprises a first magnetic element fixed to the frame at a location outside of the perimeter of the lens, and a second magnetic element fixed to the magnetic latch door, the first and second magnetic elements arranged to magnetically attract one another to close the magnetic latch door.

6. The eyewear of claim 1, wherein the ramp is provided by a wedge located on a leading portion of the free end.

7. The eyewear of claim 1, wherein the frame defines left and right lens openings for respective left and right lenses of the eyewear, and wherein each of the left and right lens openings is associated with a respective magnetic latch.

8. The eyewear of claim 1, wherein one of the first and second eyewire portions is an upper eyewire and the other one of the first and second eyewire portions is a lower eyewire, the upper and lower eyewires together forming a full rim frame.

9. The eyewear of claim 1, wherein the temple prevents the magnetic latch door from opening when the temple is in the as-worn position.

10. A lens-interchange method for an eyewear having a first eyewire portion and a second eyewire portion and a magnetic latch configured for latching the second eyewire portion to the first eyewire portion, the method comprising:
    folding a temple of the eyewear to expose a lever of the magnetic latch, the magnetic latch comprising a first magnetic portion fixed to the first eyewire portion and a second magnetic portion pivotally coupled to the first magnetic portion;
    applying a force to the lever to open the magnetic latch for separating a free end of the second eyewire portion from the first eyewire portion and removing the lens;
    releasing the force on the lever to allow magnetic attraction to return the first and second magnetic portions to the closed position thereby closing the magnetic latch; and,
    simultaneously applying a force and a counterforce to the first eyewire portion and the second eyewire portion, respectively, to re-engage the free end of the second eyewire portion with the latch door thereby re-latching the eyewire without manually opening the magnetic latch.

11. The method of claim 10 further comprising locking the magnetic latch from opening by pivoting the temple to an as-worn position.

12. An eyewear comprising:
a frame comprising a first eyewire portion and a second eyewire portion coupled to the first eyewire portion such that the first and second eyewire portions together define a lens opening configured to encircle a lens to couple the lens to the frame, the second eyewire portion having a free end that separates from the first eyewire portion to enable removal of the lens from the frame;
a temple coupled to the frame at a temple hinge and pivotable about a pivot of the temple hinge between a storage position and an as-worn position; and
a magnetic latch comprising a magnetic latch door pivotally coupled to the frame and operable, when the magnetic latch door is closed, to couple the free end of the second eyewire portion to the first eyewire portion to provide the frame in a closed configuration in which the lens is coupled to the frame, wherein the magnetic latch defines a latch cavity, wherein the second eyewire comprises a latch catch on the free end of the second eyewire, and wherein the latch catch is configured to interlock with the latch door to close the frame when the latch catch is positioned in the latch cavity and the latch door is closed, the magnetic latch further comprising at least one ramp on a surface of the free end of the second eyewire portion, the latch door, or both, wherein the ramp is configured to cause the latch door to open during insertion of the latch catch within the latch cavity in response to pressing the free end of the second eyewire toward the latch cavity.

13. The eyewear of claim 12, wherein the temple prevents the magnetic latch door from opening when the temple is in the as-worn position.

14. The eyewear of claim 12, wherein a pivot of the magnetic latch coincides with the pivot of the temple hinge.

15. The eyewear of claim 12, wherein the frame defines left and right lens openings for respective left and right lenses of the eyewear, and wherein each of the left and right lens openings is associated with a respective magnetic latch.

16. The eyewear of claim 12, wherein the first eyewire portion extends only along a first portion of a perimeter of the lens and the second eyewire portion extends only, along a second portion of the perimeter of the lens when the lens is coupled to the frame.

17. The eyewear of claim 16, wherein the first eyewire portion is an upper eyewire portion and the second eyewire portion is a lower eyewire portion.

\* \* \* \* \*

UNITED STATES PATENT AND TRADEMARK OFFICE
CERTIFICATE OF CORRECTION

| | | |
|---|---|---|
| PATENT NO. | : 12,038,626 B2 | Page 1 of 1 |
| APPLICATION NO. | : 17/890890 | |
| DATED | : July 16, 2024 | |
| INVENTOR(S) | : Eric Thorsell et al. | |

It is certified that error appears in the above-identified patent and that said Letters Patent is hereby corrected as shown below:

In the Claims

| | Reads | Should Read |
|---|---|---|
| Column 14, Line 17 | "extends only, along" | --extends only along-- |

Signed and Sealed this
Fifteenth Day of October, 2024

Katherine Kelly Vidal
*Director of the United States Patent and Trademark Office*